United States Patent
Stewart et al.

(10) Patent No.: US 7,506,155 B1
(45) Date of Patent: *Mar. 17, 2009

(54) E-MAIL VIRUS PROTECTION SYSTEM AND METHOD

(75) Inventors: Walter Mason Stewart, Potomac, MD (US); Marcelo Carrera, Silver Spring, MD (US); Robert G. Hook, Alexandria, VA (US)

(73) Assignee: Gatekeeper LLC, Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/140,464

(22) Filed: May 31, 2005

Related U.S. Application Data

(63) Continuation of application No. 09/704,790, filed on Nov. 3, 2000, now Pat. No. 6,901,519.

(60) Provisional application No. 60/213,254, filed on Jun. 22, 2000.

(51) Int. Cl.
*H04L 9/00* (2006.01)

(52) U.S. Cl. .................. 713/152; 713/151; 713/150

(58) Field of Classification Search .............. 726/22, 726/24
See application file for complete search history.

(56) References Cited

U.S. PATENT DOCUMENTS

| | | | |
|---|---|---|---|
| 5,623,600 A | 4/1997 | Ji et al. | |
| 5,740,370 A | 4/1998 | Battersby et al. | |
| 5,832,208 A | 11/1998 | Chen et al. | |
| 5,842,002 A | 11/1998 | Schnurer et al. | |
| 5,889,943 A | 3/1999 | Ji et al. | |
| 5,918,054 A | 6/1999 | Jury et al. | |
| 5,940,614 A | 8/1999 | Allen et al. | |
| 6,026,502 A | 2/2000 | Wakayama | |
| 6,092,194 A | 7/2000 | Touboul | |
| 6,094,731 A | 7/2000 | Waldin et al. | |
| 6,170,055 B1 | 1/2001 | Meyer et al. | |
| 6,185,678 B1 * | 2/2001 | Arbaugh et al. | 713/2 |
| 6,192,477 B1 | 2/2001 | Corthell | |
| 6,253,324 B1 * | 6/2001 | Field et al. | 713/187 |
| 6,311,273 B1 | 10/2001 | Helbig et al. | |

(Continued)

FOREIGN PATENT DOCUMENTS

JP  11-167533  6/1999

(Continued)

OTHER PUBLICATIONS

U.S. Appl. No. 11/650,561 entitled "Computer network virus protection system and method", inventors Walter Stewart et al., filed Jan. 9, 2007.

(Continued)

*Primary Examiner*—Pramila Parthasarathy
(74) *Attorney, Agent, or Firm*—Sterne, Kessler, Goldstein & Fox P.L.L.C.

(57) ABSTRACT

A network is protected from e-mail viruses through the use of a sacrificial server. Any executable programs or other suspicious parts of incoming e-mail messages are forwarded to a sacrificial server, where they are converted to non-executable format such as Adobe Acrobat PDF and sent to the recipient. The sacrificial server is then checked for virus activity. After the execution is completed, the sacrificial server is rebooted.

41 Claims, 4 Drawing Sheets

U.S. PATENT DOCUMENTS

| | | | |
|---|---|---|---|
| 6,377,691 B1 * | 4/2002 | Swift et al. | 380/277 |
| 6,401,210 B1 | 6/2002 | Templeton | |
| 6,487,664 B1 | 11/2002 | Kellum | |
| 6,487,994 B2 * | 12/2002 | Ahern et al. | 123/25 R |
| 6,901,519 B1 * | 5/2005 | Stewart et al. | 726/24 |
| 2002/0035696 A1 | 3/2002 | Thacker | |

FOREIGN PATENT DOCUMENTS

| | | |
|---|---|---|
| JP | 11-252158 | 9/1999 |
| JP | 2000-29799 | 1/2000 |

OTHER PUBLICATIONS

U.S. Appl. No. 11/971,754 entitled "Computer Network Virus Protection System and Method", inventors Walter Stewart et al., filed Jan. 9, 2008.

Brown, Reader Response Reveals e-mail hoax, Mar. 1998, Roanoke Times & World New start p. A5.

Cornetto, Advances in Web Technology cause e-mail client problems, Aug. 1998, InfoWorld, vol. 20, p. 13.

Horwitt, Communication Software: 104 Packages to get you on line, Nov. 1983, Business Computer Systems, vol. 2, abstract.

Microsoft, Microsoft Computer Dictionary, 1997, Microsoft Press, 3rd Edition, p. 173.

Microsoft, Microsoft Press Computer Dictionary, 1997, Microsoft Press, 3rd Sup. Edition, p. 141.

Newton, Newton's Telecom Dictionary, 1998, Telecom Books, 14.sup.th Edition, pp. 334-335.

Rad, Virus threat bytes computer users, Aug. 1998, Houston Chronicle.com, start p. 6.

"Declude Virus," http://www.declude.com/virus/index.html, © 2000-2002 Computerized Horizons.

"CERT® Advisory CA-1999-04 Melissa Macro Virus," http://www.cert.org/advisories/CA-1999-04.html.

"CERT® Advisory CA-2000-04 Love Letter Worm," http://www.cert.org/advisories/CA-2000-04.html.

"ViruSafe™ FireWall," http://www.Bristol.de/virusafe2.html, no date on record.

"ViruSafe FireWall 1.5 Software Plus-in Blocks Viruses, Vandals," http://www.cryptosoft.com/snews/feb98/16029806.htm.

* cited by examiner

E-MAIL VIRUS PROTECTION SYSTEM AND METHOD

REFERENCE TO RELATED APPLICATION

The present application is a continuation of U.S. patent application Ser. No. 09/704,790, filed Nov. 3, 2000, now U.S. Pat. No. 6,901,519, which claims the benefit of U.S. Provisional Application No. 60/213,254, filed Jun. 22, 2000. The disclosures of both of those applications are hereby incorporated by reference in their entireties into the present disclosure.

BACKGROUND OF THE INVENTION

1. Field of the Invention

The present invention relates generally to computer systems and computer networks. In particular, the present invention relates to a system and method for detecting and nullifying the effects of computer viruses. Still more particularly, the present invention relates to a system and method for detecting and nullifying the effects of computer viruses from messages and attachments delivered by electronic mail through a network.

2. Description of the Related Art

Computer viruses are a destructive aspect of the computer revolution that threatens its potential growth and usability. Significant time and money are lost annually combating the effects of this insidious, and seemingly endemic, problem. A computer virus is actually just an unauthorized block of executable computer code purporting to be harmless or is hidden in another valid computer program. Once the valid program is executed, the unauthorized virus code is also activated. The effect of such viruses can be simple pranks, such as causing messages to be displayed on the screen, or more serious activities, such as destroying programs and data. Once executed, they often spread quickly by attaching themselves to other programs in the system. Infected programs may in turn continue the cancerous replication by copying the virus code to still other programs. The proliferation of Internet E-mail has only accelerated the problem in that local viruses can now spread internationally in a matter of hours.

Prior art attempts to reduce the effects of viruses and prevent their proliferation by using various virus detection schemes have been only marginally successful. The reason for the limited success is that the prior art methods attempt to identify the existence of a virus before taking steps to protect a user. For example, many virus detection programs use a method known as "behavior interception," which monitors the computer or system for key system functions such as "write," "erase," "format disk," etc. When such operations occur, the virus detection program prompts the user for input as to whether such an operation is expected. If the suspect operation was not expected (e.g., the user was not operating any program that employed such a function), the user can abort the operation. Another virus detection method, known as "signature scanning," scans program code that is being copied onto the system. Again, the virus detector searches for recognizable patterns of program code, such as the program attempting to write into specific file or memory locations, that betray the possible existence of a virus. Yet another prior art approach to virus detection performs a checksum (mathematical signature) on critical programs stored on a system that are known to be free of viruses. If a virus later attaches itself to one of these programs, the checksum value—which is periodically recalculated—will be different and thus, the presence of a virus detected.

While all of these methods work to some degree, they tend to suffer from one critical drawback: They depend on recognizing the virus as a virus before instituting any protection for the user. All too often, new (unrecognized) viruses must first wreak havoc on a significant number of victims before the new virus' identifying characteristics are recognized and included in the (ever-lengthening) watch lists of the various virus protection programs available to government and industry.

SUMMARY OF THE INVENTION

The present invention overcomes the limitations of the prior art by implementing a system and method that eliminates the threat of viruses transmitted on a computer network by rendering any viruses inoperable. As discussed above, all viruses are programs. Like all programs, they are designed to run in a specific or predictable environment. Viruses depend on a host computer's operating system to recognize them as valid programs. They also depend on the host computer's central processing unit (CPU) to understand the virus' commands and obey them. Non executable entities are, by nature, incapable of launching a virus. Therefore, if a host computer converts all data received via e-mail (mail and attachments) to non-executable entities, any embedded virus is rendered inoperable. The present invention describes a method and system of virus protection that involves passing all e-mail and attachments through various conversion states that, while harmless to e-mail text and attachments, the conversions are lethal to executable code (viruses).

Even though the majority of e-mail received by a company or government agency should contain no valid executable components, a small percentage of e-mail attachments, such as "working drafts," and standard contract templates may require user updating or valid executable macros. Therefore, the present invention also describes a system and method of identifying "Approved" embedded macros and—as long as they have not been modified—allowing them to survive the virus killing conversions.

Finally, the present invention also includes a unique "sacrificial PC" system and method capable of safely executing, detecting (via examination of the results of execution), and safely recovering from potentially virus-laden e-mails.

BRIEF DESCRIPTION OF THE DRAWINGS

A preferred embodiment will be set forth in detail with reference to the drawings, in which.

DETAILED DESCRIPTION OF THE PREFERRED EMBODIMENT

Though not essential to every embodiment of this invention, the preferred embodiment makes use of the following concepts and principles:

1. Recipients of e-mails are ultimately more qualified to determine what information is acceptable than a generalized software program or system
2. If given an opportunity, a user can clearly define which e-mail types and attachments he or she does or does not wish to receive.

3. The ability of users to accept macros and other forms of executable code commonly used in modern computer generated business forms and templates must be maintained.
4. All information is potentially important to a user. Therefore, software systems, including security programs, should not arbitrarily delete or withhold e-mail content without specific knowledge and authorization of the owner of the e-mail system.
5. The value of information tends to decrease over time. Therefore, information contained in e-mails should not be unreasonably delayed.

The gatekeeper method and system described herein operate under the following rules and definitions:
1. Any macro or executable code that alters the physical appearance of an e-mail or attachment is considered by the gatekeeper to be a customized form.
2. All customized forms requiring user input must be authorized by the owner of the e-mail system.

In an effort to provide recipients with all of the contents of all e-mails and attachments (not prohibited by the owner of the e-mail system) all unauthorized form will be executed; however, the form's output (not the form itself) will be delivered to the user in a "safe" non-executable format.

The Gatekeeper method and system described defines and ability to authorize and authenticate all forms.

Figure 1:
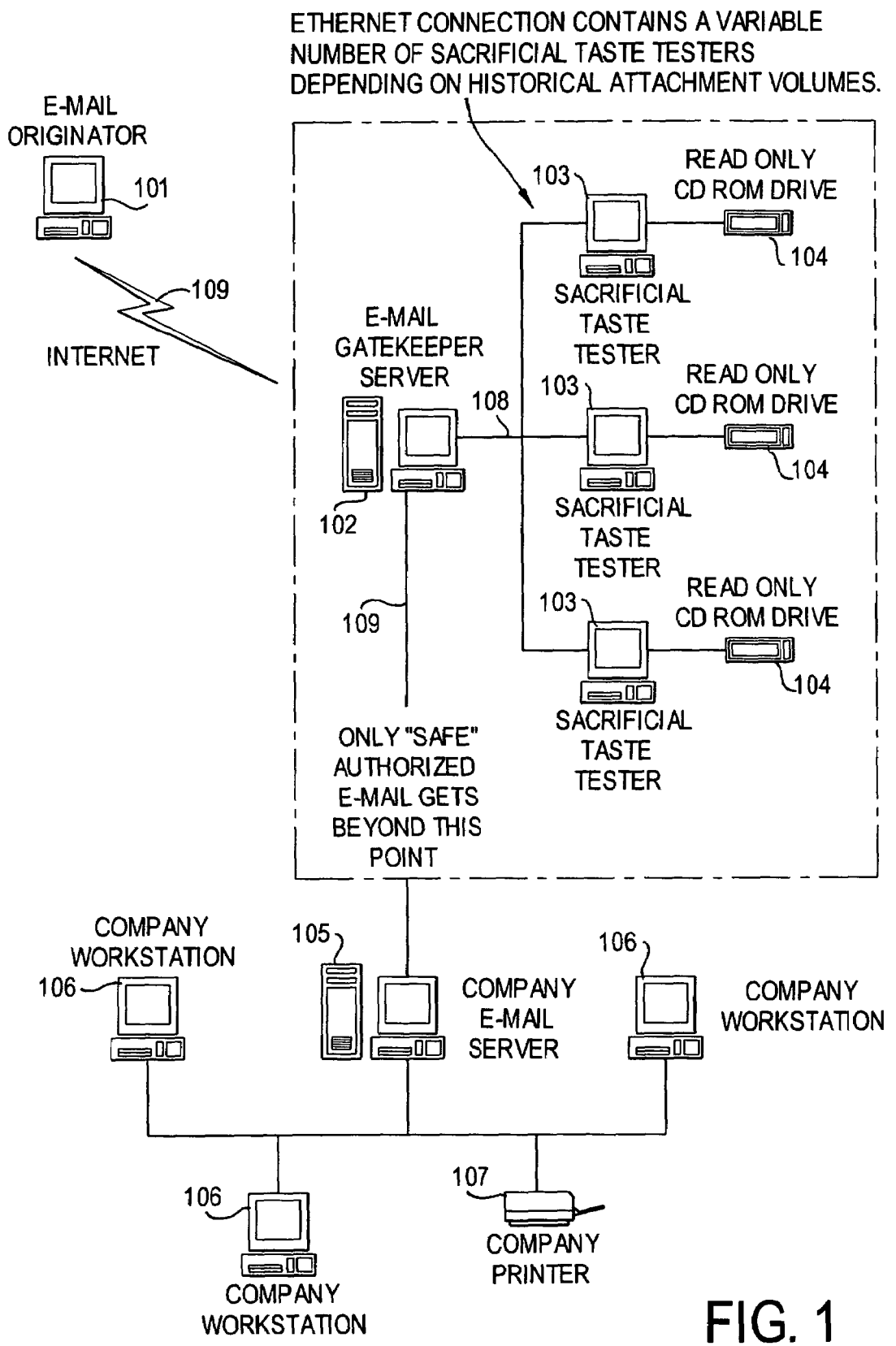
FIG. 1 shows a block diagram of an e-mail gatekeeper system.
Figure 2:
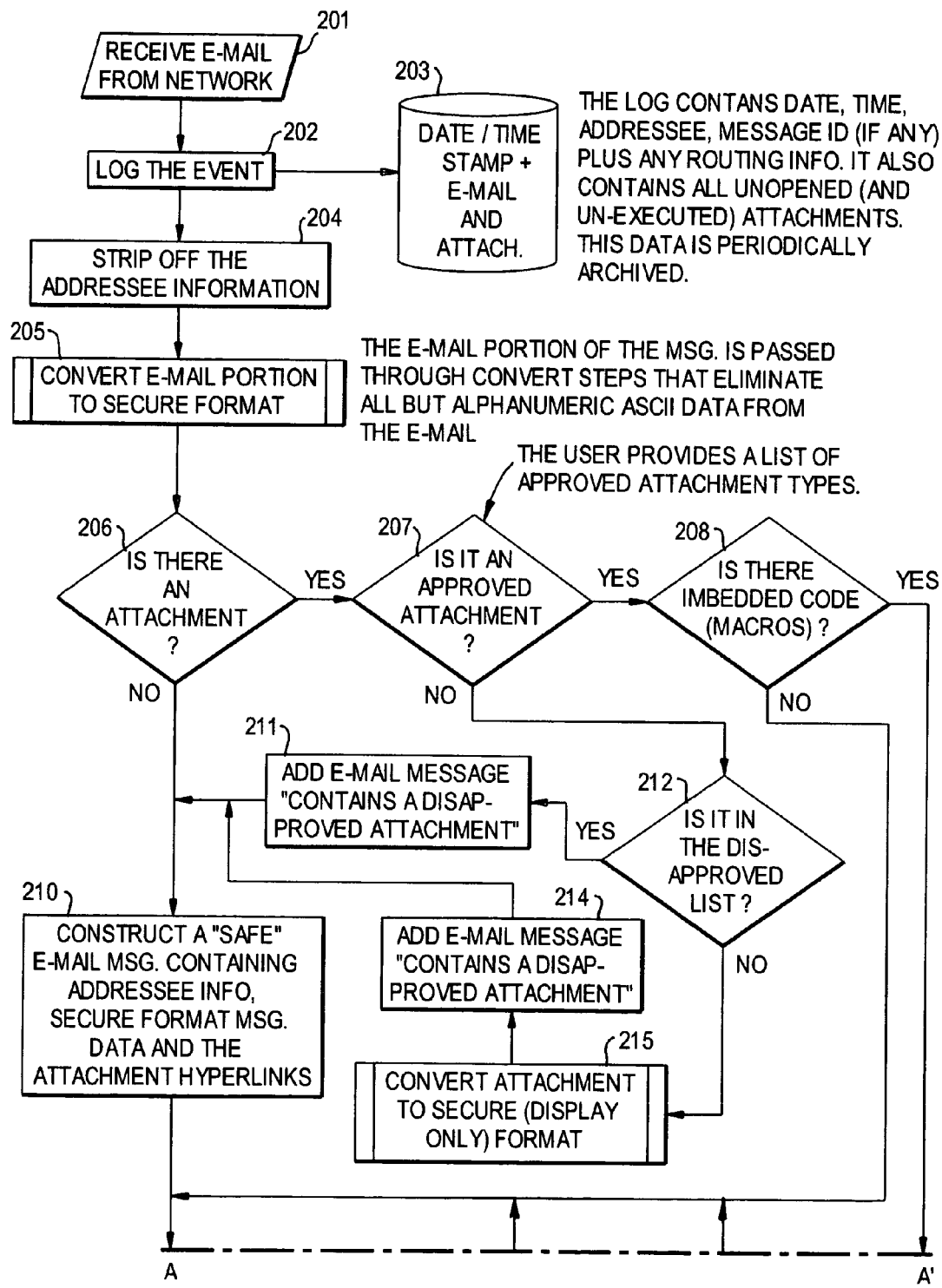
FIGS. 2 and 2A show a flow chart of operations carried out in the e-mail gatekeeper system.
Figure 2A:
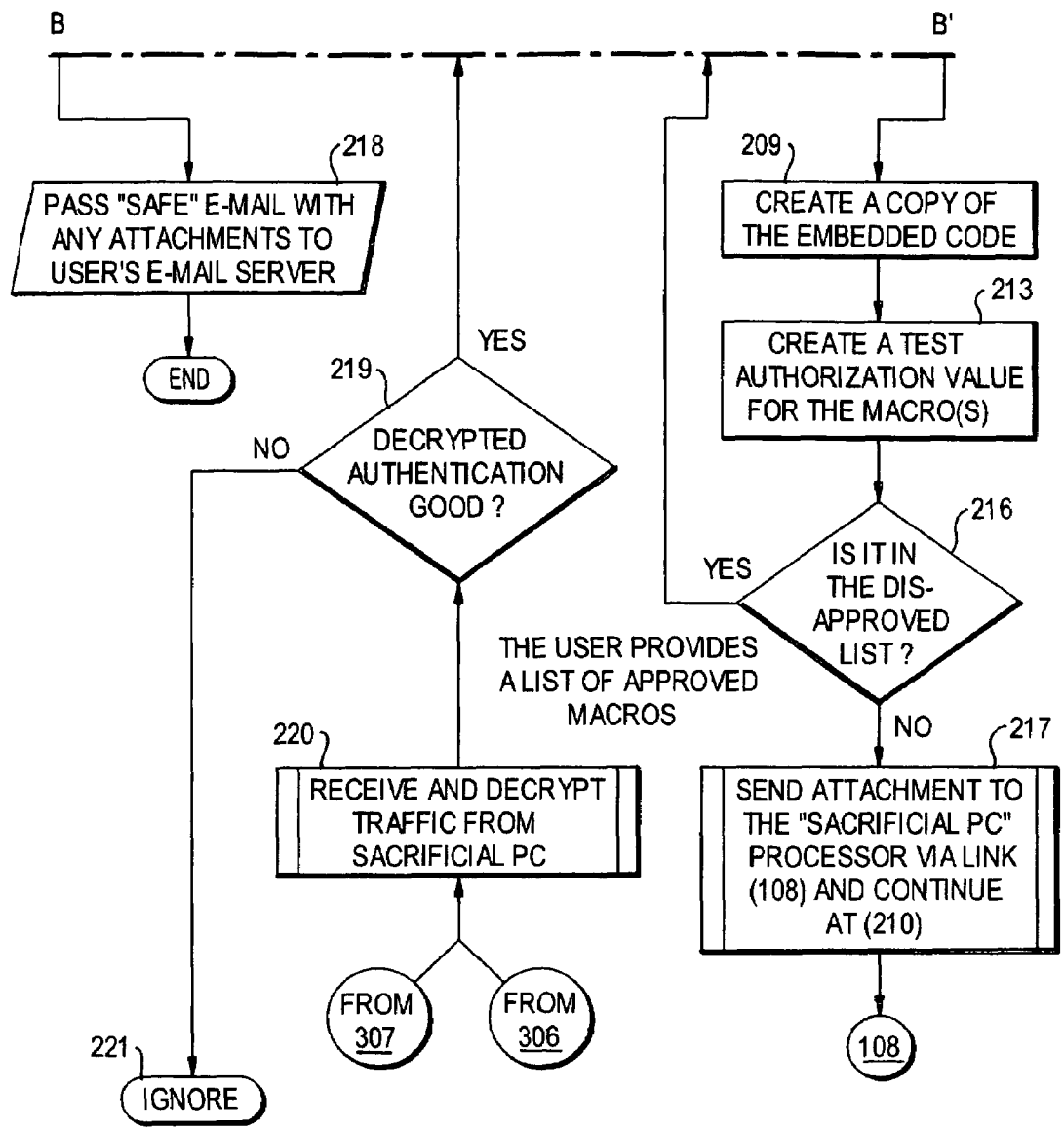
Figure 3:
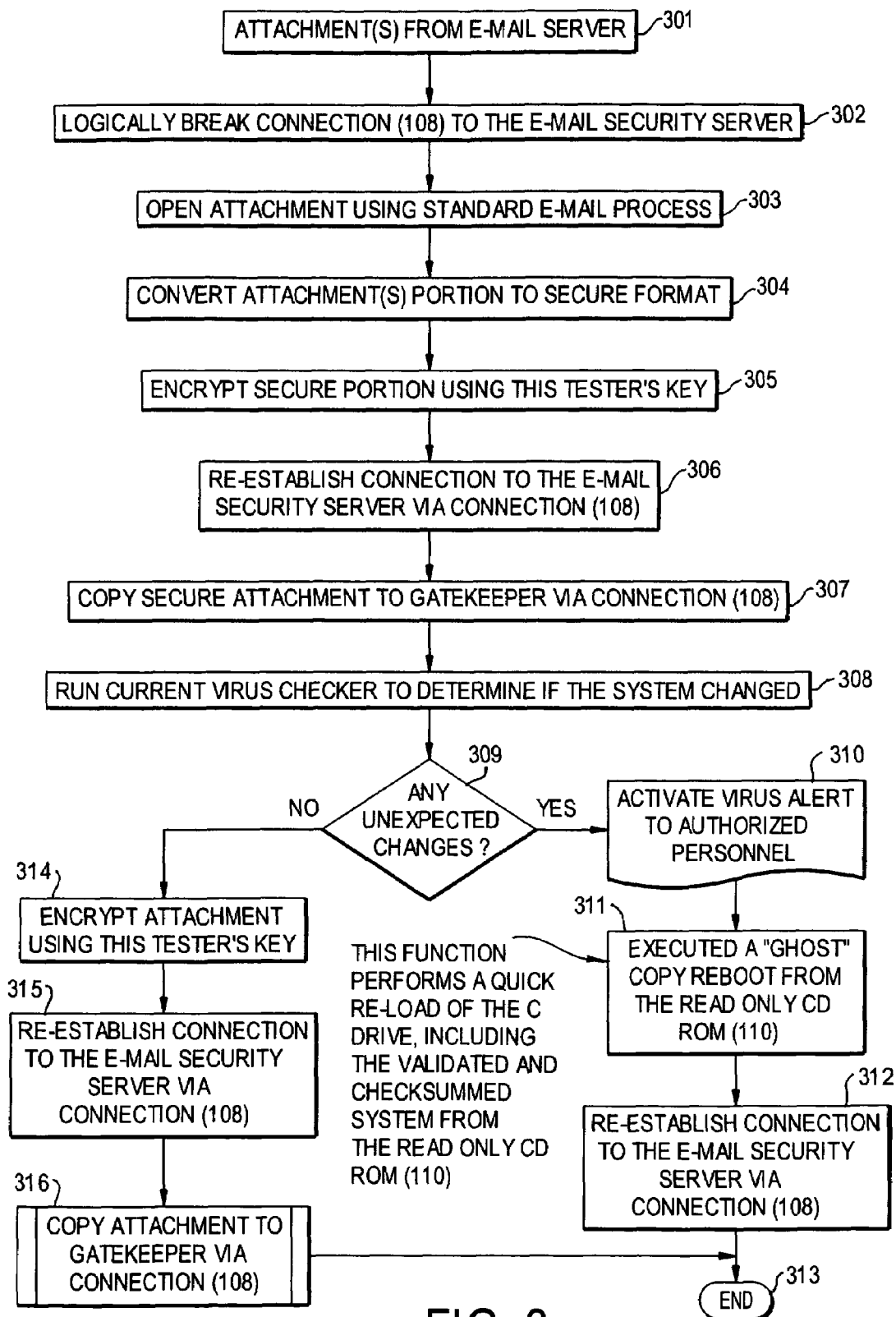
FIG. 3 shows a flow chart of operations carried out by a sacrificial processor.

The virus detection system and method of the present invention preferably operates on a system as depicted in FIG. 1.

An intermediary E-mail security server (102), referred to as "the Gatekeeper" intercepts all e-mail messages and attachments sent by a sender (101) via a communications network, such as the Internet (109). The arriving unopened e-mail and attachments are archived and logged (202) with a date and time stamp, plus any routing information available. Address data is then stripped off of the e-mail (204) for attachment to the "safe" e-mail constructed at (210). The e-mail portion of the Internet e-mail received from (201) is passed through a conversion process (205) that eliminates all executable code leaving only alphanumeric message text. Any imbedded hyperlinks or email addresses, while still identifiable as links or addresses, are rendered inoperable as executable "links." The Gatekeeper (102) then checks to see if the arriving e-mail contains an attachment (206). If the e-mail contains no attachment, processing continues at step (210).

If the e-mail contains an attachment, the attachment types (extensions) are validated against several lists provided by the client during the installation process. The e-mail attachment type is first checked against a list of client approved acceptable file extensions. If the attachment extension is not in the approved list, it is considered either disapproved or unknown. (212). If the attachment extension type is found in the disapproved list, a message is constructed indicating that "this e-mail contains a disapproved attachment." The disapproval message is included in the safe e-mail constructed in step (210).

If the e-mail contains an attachment with an extension that is not in either the "disapproved" or "approved" lists, the entire attachment is passed through a conversion process (205) that eliminates all executable code leaving only alphanumeric message text. This process will generally create a readable copy of the attachment, but will not allow the attachment to open any processes or applications, including executable virus code. If the included attachment from (206) is of an approved extension type, attachment inspection processing continues at (208), which checks the approved attachment extension to see if it contains any executable code (macros).

This process involves reading the attachment file's internal format and identifying any executable code, such as macros that may be present. Any executable code found is noted and identified for authentication (209). An encrypted authentication identifier is created for the executable code by passing it through an algorithm such as, a checksum or hashing algorithm (213), that uniquely identifies the string of executable code. The unique identifier is then encrypted using a key known only to the Gatekeeper program or server. The authentication identifier is then compared to a list of approved code contained by the Gatekeeper and supplied by the Client (216). Since this system and method described validates only the executable code (macros), the non-executable data portion of the attachment can safely be changed or updated interactively. If the attachment contains approved macros, the original attachment is made available to the recipient. If the attachments contain unapproved macros, the attachment is forwarded to an available sacrificial PC processor (103) via data link (108) for conversion to a non-executable format and further detailed virus testing. The method just described for detecting, authenticating, and approving a macro can be used to authenticate and approve any form of executable code embedded in an attachment or in the body of an e-mail message. Such code can include compiled programs, interpretive code, scripts, batch language, markup language code, or the like located in any part of the e-mail message, including the body and the attachments.

Sacrificial PC processing begins with the original e-mail attachment being passed to an available sacrificial PC (105) via a data link (108) connecting the Gatekeeper server (102) with the sacrificial PC. Once the transfer of the attachment is complete the data link (108) is intentionally broken. This eliminates the possibility of any unintended communications back to the Gatekeeper. The original attachment is then opened using standard Windows application processing supplied by the client (303). The opened attachment is then passed through a process (304) which converts the attachment to a non-executable image format, such as Portable Document Format (PDF). Note there are many suitable image formats. The process would choose one selected by the client. The safe image format version of the attachment is then encrypted in the sacrificial PC's unique authentication key assigned by the Gatekeeper at startup. The data link (108) to the Gatekeeper is then re-established (306) and the encrypted non-executable attachment is returned to the Gatekeeper (307).

All communications from a sacrificial PC to the Gatekeeper are interrogated by the Gatekeeper's communications processor (220). Before being accepted by the Gatekeeper as a valid message, the data must pass a strict authentication test (219). The authentication process is as follows.

At System startup (and periodically, if desired) the Gatekeeper creates a randomly generated set of authentication parameters to be used by each sacrificial PC when communicating with the Gatekeeper. When a sacrificial PC wants to communicate with the Gatekeeper it first sends a handshake packet to the Gatekeeper identifying the specific PC requesting communication. It also sends a short (unencrypted) cleartext portion of the data to be communicated encapsulated within the handshake packet.

Once the Gatekeeper acknowledges the handshake, the sacrificial PC sends the full information packet to the Gatekeeper. A random amount of the packet has been encrypted in the sacrificial PC's unique key. The specific amount of data encrypted by the sacrificial PC was determined by one of the authentication parameters sent by the Gatekeeper at startup. The Gatekeeper decrypts all data packets it receives based on the assumed key of the specific sacrificial PC. In other words, "If you are who you say you are, you encrypted your data in the following way." Once decrypted, the Gatekeeper compares the clear text portion of the data received in the handshake packet with the decrypted data packet (219). If they match, the data is accepted; if they do not, the data is not accepted. The authentication technique is based on known "challenge and response" authentication techniques.

Once the sacrificial PC has sent the read only "safe" attachment back to the Gatekeeper, a special validation process examines the sacrificial PC to determine if any unexpected changes have occurred (308) and (309) on the sacrificial PC. Unexpected changes could include the addition or deletion of files, files that change name, extension, or content unexpectedly, (including morphing of the tested attachment itself), attempted sensing of the date and time features of the sacrificial PC, etc.

Also, when the opportunity is available, as with attachments created using the Microsoft suite of office products, the sacrificial PC processor takes advantage of the "Enable Macros" "Disable Macros" feature. This built-in feature makes it possible to open a document without allowing any embedded code (macros) to execute. Two copies of the same document can then be created, one created with macros executed and one created without macros executed. The two copies of the same document can then be examined to determine if executing the macro had any effect on the information content of the document. By comparing the two documents, the sacrificial PC can determine whether or not the macro is relevant to the particular document being tested.

If execution of the macro was necessary to produce the information contained in the tested document, then the macro's contribution is contained in the print image copy of the document produced by the sacrificial PC when it executed the document with macros enabled. This is the copy that is sent to the recipient.

Similarly, if testing the document with "macros disabled" has no impact on the content of the document, then the suspect macro is not necessary. It logically follows then, that the suspect macro is either irrelevant to the content the particular version of the document being tested or, it is a virus. In either case, the sacrificial PC has intercepted and nullified the suspect macro's impact on the recipient.

Any unexpected changes in the system trigger a virus alert. Standard user security processes alert all authorized personnel (309). A special "ghosting" reload of the operating system then takes place. The process is as follows.

Each Sacrificial PC is configured with two hard drives. Each hard drive is configured with a single active partition and contains a safe copy of the operating system obtained from the read-only device (110). The designated active partition—defined at start-up—is "toggled" between the two physical hard drives. This is done to increase the speed of reloading and to maximize the availability of sacrificial PCs. The unused drive—which is the one used to test the last attachment—is re-loaded, via ghosting software (310), with a fresh copy of the operating system obtained from the read only CD ROM (110). The connection between the Gatekeeper (102) and the sacrificial PC (105) is then re-established.

Once the sacrificial PC is re-ghosted, it is brought back on line and the GateKeeper assigns it a new authentication Key and encryption length parameter.

Once the Gatekeeper sends data to a sacrificial PC, it notes the time the data was sent. If no data is received back from a sacrificial PC within a specified period of time (typically two minutes), the Gatekeeper assumes the sacrificial PC has become the victim of a virus and died. When this occurs, the Gatekeeper signals a virus alert and requests human intervention to recover the dead sacrificial PC.

The method and system described above can also be implemented with the sacrificial PC implemented as a virtual machine or environment in the operating system of another computer. This computer could be the gatekeeper, an e-mail server or any other computer.

The method and system described above also be implemented with the gatekeeper system implemented as part of another system, such as a component of an already existing e-mail server.

The gatekeeper system and method described uses the file and macro authentication and encrypted client approval techniques described above to protect itself from both internal and external "hacking" attacks that may attempt to substitute, modify, destroy or otherwise nullify gatekeeper files and programs.

While a preferred embodiment has been set forth in detail above, those skilled in the art who have reviewed the present disclosure will readily appreciate that other embodiments can be realized within the scope of the invention. For example, the use of certain hardware, operating systems, or the like should be construed as illustrative rather than limiting. Therefore, the present invention should be construed as limited only by the appended claims.

We claim:

1. A method for protecting a network from a virus contained in an e-mail message as executable code, the method comprising:
   receiving the e-mail message;
   converting the executable code from an executable format to a non-executable format by using an application-level process which retains an appearance, human readability, and semantic content of the e-mail message; and
   forwarding the non-executable format to a recipient of the e-mail message.

2. The method of claim 1, wherein the executable code is contained in a body of the e-mail message.

3. The method of claim 2, wherein the executable code comprises a hypertext link, and wherein the converting comprises deactivating the hypertext link.

4. The method of claim 1, wherein the executable code is contained in an attachment in the e-mail message.

5. The method of claim 4, wherein the converting comprises:
   forwarding the attachment from a gatekeeper server to a sacrificial server; and
   converting the attachment to the non-executable format on the sacrificial server.

6. The method of claim 5, wherein the converting further comprises examining the sacrificial server for virus activity.

7. A method for protecting a network from a virus contained in an e-mail message as executable code, the method comprising:
   receiving the e-mail message in a gatekeeper server;
   converting the executable code from an executable format to a non-executable format; and
   forwarding the non-executable format to a recipient of the e-mail message, wherein the executable code is contained in an attachment in the email message;
   wherein the converting comprises:
      forwarding the attachment from the gatekeeper server to a sacrificial server;
      converting the attachment to the non-executable format on the sacrificial server;
      examining the sacrificial server for virus activity; and rebooting the sacrificial sever from a safe copy of an operating system obtained from a read-only device.

8. A method for protecting a network from a virus contained in an e-mail message as executable code, the method comprising:
receiving the e-mail message in a gatekeeper server;
converting the executable code from an executable format to a non-executable format; and
forwarding the non-executable format to a recipient of the e-mail message, wherein the executable code is contained in an attachment in the email message;
wherein the converting comprises:
forwarding the attachment from the gatekeeper server to a sacrificial server;
converting the attachment to the non-executable format on the sacrificial server;
examining the sacrificial server for virus activity; and
wherein communications between the gatekeeper server and the sacrificial server are authenticated using a challenge-and-response technique.

9. The method of claim 4, wherein the converting comprises:
maintaining a list of approved attachment types;
determining whether the attachment is of a type which is in the list of approved attachment types; and
if the attachment is not of a type which is in the list of approved attachment types, informing the recipient that a message containing a non-approved attachment has been received.

10. The method of claim 1, wherein the converting comprises:
maintaining a list of approved executable code;
determining whether the executable code is in the list of approved executable code; and
deactivating the executable code if the executable code is not in the list of approved executable code.

11. The method of claim 10, wherein:
the list of approved executable code includes information for determining whether the approved executable code has been altered; and
the converting further comprises:
determining whether the executable code has been altered; and
deactivating the executable code if the executable code has been altered.

12. The method of claim 11, wherein the determining whether the executable code has been altered is performed through an algorithmic technique.

13. The method of claim 12, wherein the algorithmic technique is a check-summing technique.

14. The method of claim 12, wherein the algorithmic technique is a hashing technique.

15. The method of claim 1, wherein the converting comprises:
forming a first copy and a second copy of at least a portion of the e-mail message containing the executable code;
executing the executable code in the first copy but not the second copy; and
after the executable code in the first copy has been executed, comparing the first copy to the second copy to determine an effect of the executable code.

16. A system for protecting a network from a virus contained in an e-mail message as executable code, the system comprising:
a workstation computer on the network used by a recipient of the e-mail message; and
a computer on the network for converting the executable code from an executable format to a non-executable format by using an application-level process which retains an appearance, human readability and semantic content of the e-mail message and forwarding the non-executable format to the recipient.

17. The system of claim 16, wherein the executable code is contained in a body of the e-mail message.

18. The system of claim 17, wherein the executable code comprises a hypertext link, and wherein the computer for converting deactivates the hypertext link.

19. The system of claim 16, wherein the executable code is contained in an attachment in the e-mail message.

20. The system of claim 16, wherein the computer for converting is a sacrificial server.

21. The system of claim 20, wherein the sacrificial server is examined for virus activity.

22. A system for protecting a network from a virus contained in an e-mail message as executable code, the system comprising:
a workstation computer on the network used by a recipient of the e-mail message;
a gatekeeper server, in communication with the workstation computer over the network, for receiving the e-mail message; and
a computer on the network for converting the executable code from an executable format to a non-executable format and forwarding the non-executable format to the workstation computer, wherein the computer for converting is a sacrificial server which is separate from the gatekeeper sever, wherein the sacrificial server is examined for virus activity, wherein the network further comprises a read-only device, and wherein the sacrificial server is rebooted from a safe copy of an operating system obtained from the read-only device.

23. A system for protecting a network from a virus contained in an e-mail message as executable code, the system comprising:
a workstation computer on the network used by a recipient of the e-mail message;
a gatekeeper server, in communication with the workstation computer over the network, for receiving the e-mail message; and
a computer on the network for converting the executable code from an executable format to a non-executable format and forwarding the non-executable format to the workstation computer, wherein the computer for converting is a sacrificial server which is separate from the gatekeeper sever, wherein the sacrificial server is examined for virus activity, wherein communications between the gatekeeper server and the sacrificial server are authenticated using a challenge-and-response technique.

24. The system of claim 16, wherein the network maintains a list of approved attachment types, determines whether the attachment is of a type which is in the list of approved attachment types, and, if the attachment is not of a type which is in the list of approved attachment types, informs the recipient that a message containing a non-approved attachment has been received.

25. The system of claim 16, wherein the network maintains a list of approved executable code, determines whether the executable code is in the list of approved executable code, and deactivates the executable code if the executable code is not in the list of approved executable code.

26. The system of claim 25, wherein:
the list of approved executable code includes information for determining whether the approved executable code has been altered;
the network determines whether the executable code has been altered; and
the executable code is deactivated if the executable code has been altered.

27. The system of claim 26, wherein the system determines whether the executable code has been altered through an algorithmic technique.

28. The system of claim 27, wherein the algorithmic technique is a check-summing technique.

29. The system of claim 27, wherein the algorithmic technique is a hashing technique.

30. The system of claim 16, wherein the computer for converting converts the executable code by:
forming a first copy and a second copy of at least a portion of the e-mail message containing the executable code;
executing the executable code in the first copy but not the second copy; and
after the executable code in the first copy has been executed, comparing the first copy to the second copy to determine an effect of the executable code.

31. A sacrificial server for use on a network, the sacrificial server comprising:
communication means for receiving an e-mail attachment from the network; and
processing means for converting the e-mail attachment from an executable format to a non-executable format by using an application-level process which retains an appearance, human readability and semantic content of the e-mail message and for returning the e-mail attachment to the network.

32. The sacrificial server of claim 31, wherein the sacrificial server is examined for virus activity.

33. The sacrificial server of claim 32, wherein the sacrificial server further comprises a read-only device and is rebooted from a safe copy of an operating system obtained from the read-only device.

34. The sacrificial server of claim 31, wherein communications between the network and the sacrificial server are authenticated using a challenge-and-response technique.

35. The sacrificial server of claim 31, wherein the sacrificial server stores a list of approved attachment types, determines whether the attachment is of a type which is in the list of approved attachment types, and, if the attachment is not of a type which is in the list of approved attachment types, informs the network that a message containing a non-approved attachment has been received.

36. The sacrificial server of claim 31, wherein the sacrificial server maintains a list of approved executable code, determines whether the attachment contains executable code and whether the executable code is in the list of approved executable code, and deactivates the executable code if the executable code is not in the list of approved executable code.

37. The sacrificial server of claim 36, wherein:
the list of approved executable code includes information for determining whether the approved executable code has been altered;
if the executable code is in the list of approved executable code, the sacrificial server determines whether the executable code has been altered; and
the executable code is deactivated if the executable code has been altered.

38. The sacrificial server of claim 32, wherein the sacrificial server determines whether the executable code has been altered through the use of an algorithmic technique.

39. The sacrificial server of claim 38, wherein the algorithmic technique is a check-summing technique.

40. The sacrificial server of claim 38, wherein the algorithmic technique is a hashing technique.

41. The sacrificial server of claim 31, wherein the processing means converts the executable code by:
forming a first copy and a second copy of at least a portion of the e-mail message containing the executable code;
executing the executable code in the first copy but not the second copy; and
after the executable code in the first copy has been executed, comparing the first copy to the second copy to determine an effect of the executable code.

* * * * *